June 20, 1944.  H. W. SHONNARD  2,352,129
FREIGHT TRANSFER APPARATUS
Filed Sept. 24, 1941  2 Sheets-Sheet 1
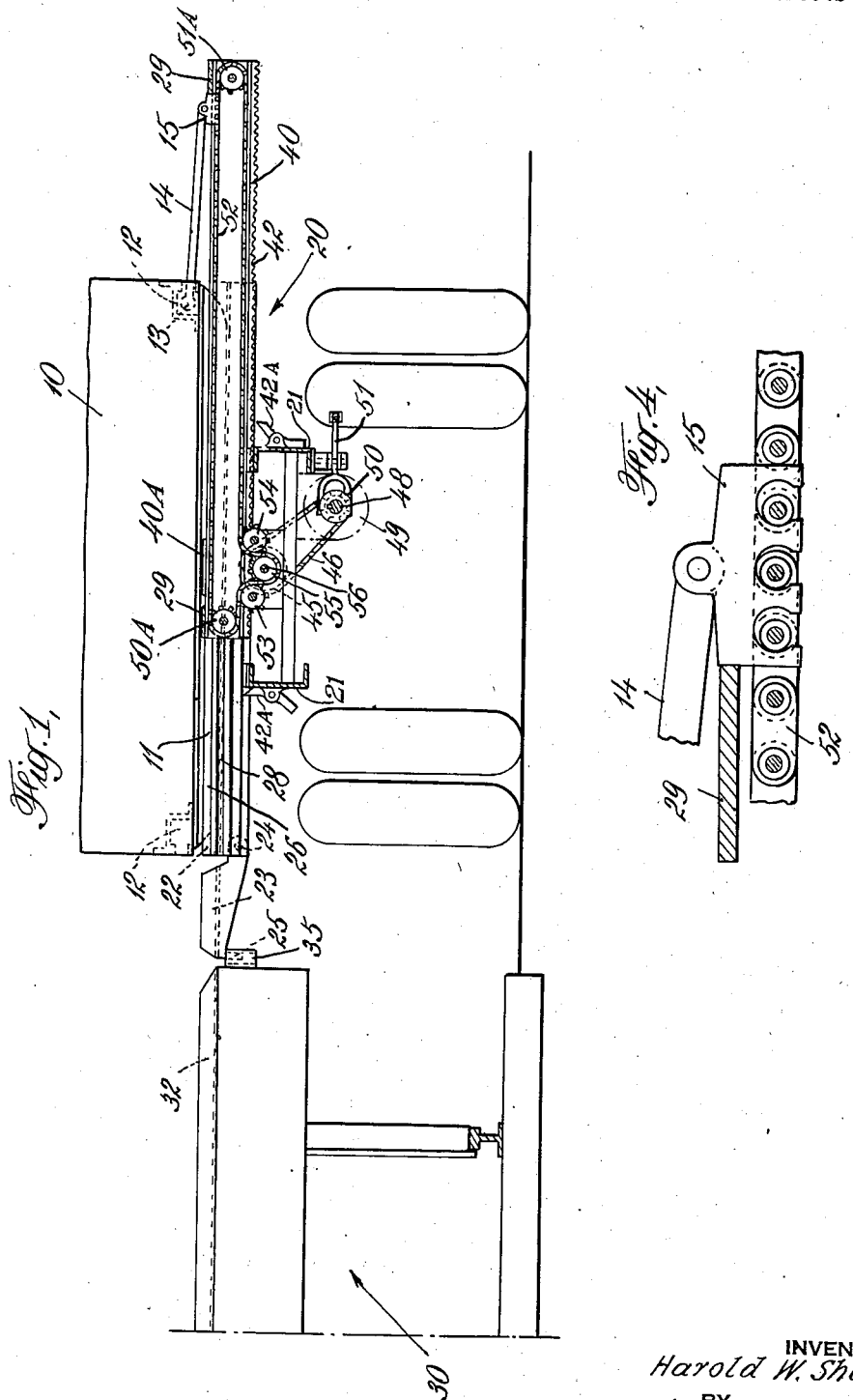
INVENTOR
Harold W. Shonnard
BY
Marshall & Hawley
ATTORNEYS

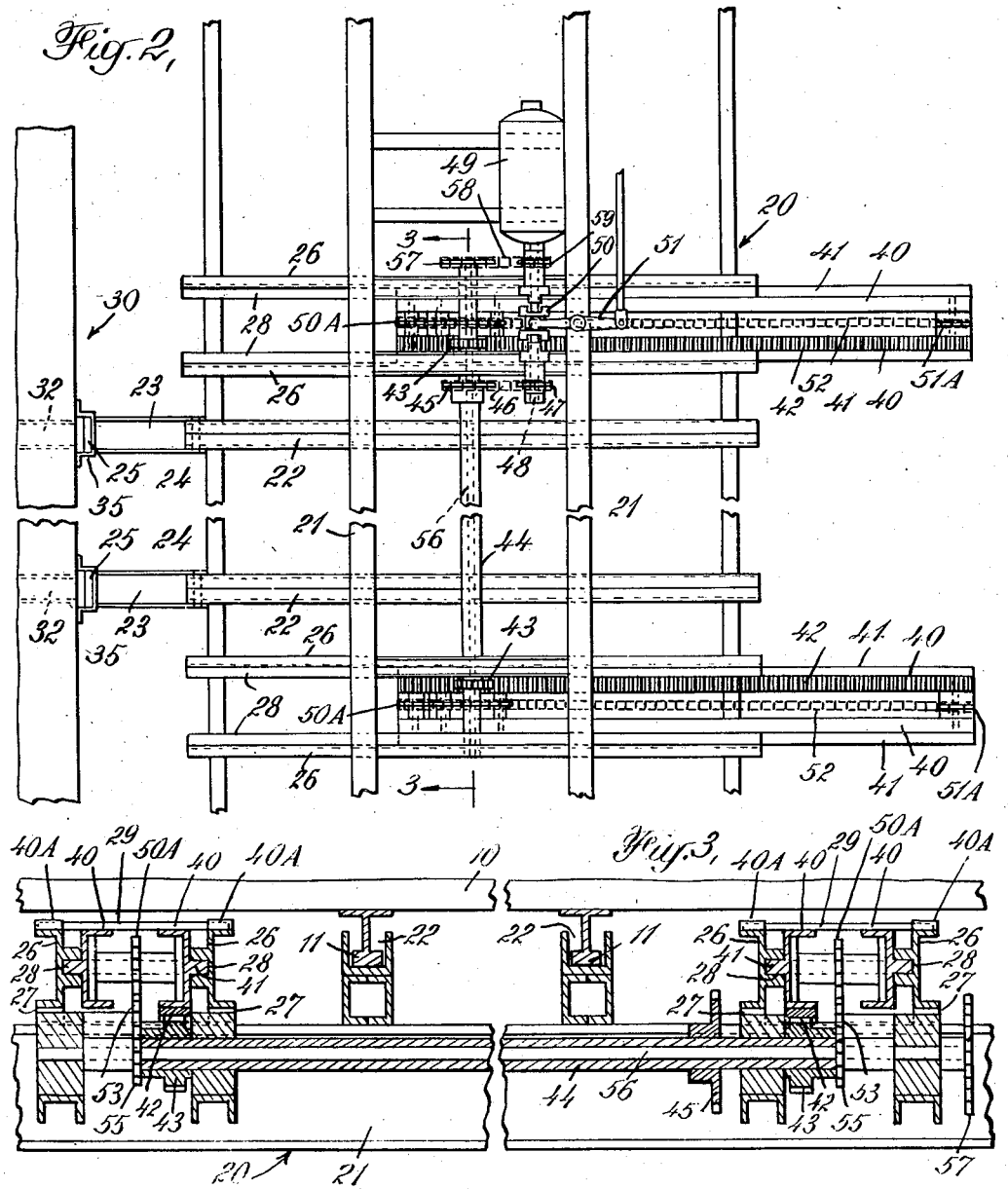

Patented June 20, 1944

2,352,129

UNITED STATES PATENT OFFICE 2,352,129

FREIGHT TRANSFER APPARATUS

Harold W. Shonnard, Montclair, N. J.

Application September 24, 1941, Serial No. 412,080

6 Claims. (Cl. 214—83)

This invention relates to improvements in freight transfer apparatus, and its object is to provide a simple and efficient mechanism on a vehicle for transferring containers to or from the vehicle with substantially no interruption of the movement of the containers while they are being transferred.

More specifically, my invention relates to the type of apparatus which is adapted to move loads transversely of a vehicle, which apparatus is contained within the overall width of the vehicle, but is capable of being extended laterally beyond the sides of the vehicle in order to effect a lateral transfer movement of a load greater than the width of the vehicle and resides in novel arrangements of parts which are simple and inexpensive and have advantages over such devices as have been available heretofore for this purpose.

These and other objects and advantages will appear in the following specification in which I will describe specific embodiments of the invention and point out its novel features in claims.

Referring to the drawings:

Figure 1 is a sectional end elevation of a truck equipped with a mechanism which is made according to and embodies my invention and an adjacent railway car, the transfer mechanism being shown in section;

Fig. 2 is an inverted plan view of the parts shown in Figure 1;

Fig. 3 is a sectional elevation of the transfer mechanism shown in the preceding figures, the section being taken on the line 3—3 of Fig. 2;

Fig. 4 is an enlarged detail elevation of one of the chain-engaging dogs on the free end of a push-pull bar together with its associated parts.

10 designates a container shown in full lines in Fig. 1 as supported over the longitudinal center of a road vehicle 20, the chassis frame of which comprises the longitudinal beams designated by the reference numeral 21. 11 designates skids on the bottom of the container which are seated in transverse channels 22 on the vehicle and which can be moved into similar channels 32 on the floor of a railway car 30 or on a platform similarly positioned in relation to the vehicle. 23 designates one of the bridges which are pivoted at 24 to the ends of the channels 22. These have lips 25 adapted to engage sockets 35 affixed to the edge of the car 30, and are constructed to form channels for the skids 11 between the channels 22 and 32.

26, 26 designate transverse members flanged at the top and bottom. Their lower flanges are rigidly affixed to the beams 21 of the vehicle chassis outside the channels 22 (Fig. 3), as at 27. The intermediate parts of these members form inwardly facing grooves or guides 28.

40 designates rigid frames which have outwardly projecting flanges 41 fitted to slide in the grooves 28.

A rack 42 is affixed to the lower part of each of the frames. 43, 43 are pinions affixed to a sleeve 44 and in mesh with the racks 42. 45 is a sprocket wheel affixed to the sleeve 44 and connected by a sprocket chain 46 with a sprocket wheel 47 loosely mounted on the shaft 48 of a reversible motor 49 on the chassis of the vehicle.

50 is a clutch member slidably but non-rotatively mounted on the motor shaft. This clutch can be shifted by a lever 51 into and out of driving engagement with the sprocket wheel 47. By this arrangement the frames 40 may be moved simultaneously in either direction in the guides 28.

In order to limit the movement of the frames in relation to the transverse members 26, transverse plates 29 are affixed to the top of frames 40, 40 near their ends and extending over the upper flanges of the stationary members 26. Transverse stops 40A, 40A are affixed to the top of the members 26 midway of their length in horizontal alinement with the plates 29.

50A, 51A are sprocket wheels rotatably mounted on transverse axles near the ends of the frame 40, and 52 are sprocket chains which run over them. The sprocket chains run over guide wheels 53, 54 and under drive sprockets 55, 55 which are affixed to the shaft 56 on which is a sprocket 57 connected by a chain 58 with a sprocket wheel 59 loosely mounted on the motor shaft 48 (Fig. 2).

The clutch member may be moved into and out of engagement with an extended hub of the sprocket wheel 59. By this arrangement the chains 52 may be driven simultaneously in either direction.

On the containers 10 are hollow housings 12 (Fig. 1) slotted at one end to receive cross pins 13 on the end of push pull bars 14. On the other ends of these bars are dogs 15 which are arranged to engage the chains and subsequently engage the transverse plates 29 on the frames 40 as shown clearly in Fig. 4.

The frames are normally in the center of the vehicle and do not extend beyond its sides. When it is desired to move a container 10 from the vehicle 20 to the car 30, the frames are first moved to the right, as shown in Fig. 1, until the cross pieces 29 at the inner end of the frames abut the stops 40A. With the clutch 50 disengaged this can be done by hand. One end of each of the push-pull bars 14 is attached to the container 10 and the dogs 15 are attached to the chains 52.

The sprockets 56 are then rotated in a clockwise direction which will cause the frames 40 to be pulled to the left because of the contact of the transverse member 29 on the right hand end of the members with the dogs 15. This movement will be transmitted through the bars 14 to the container 10 and will continue until the transverse members 29 abut the stops 40A or until the left hand ends of the frames abut the car 32. Thereupon the clutch is thrown out to discontinue the movement of the chains and the frames may be locked in place. After this the chains are driven in the opposite direction so that the upper runs of the chains travel to the left carrying the dogs with them and through the bars push the container until it is fully transferred to the car. It is obvious that this operation may be reversed to move the container from the car to the vehicle and that such transfer may be made to or from either side of the vehicle. The operation thus described may be performed without the use of the rack and pinion mechanism.

If the frames 40 are too heavy to be moved out manually to the overhanging position shown in Fig. 1, they may be driven out to the desired position by the rack and pinion mechanism. After the dogs 15 are attached to the chains, the initial movement is imparted to the container by driving the frames back to the center of the vehicle by the rack and pinion mechanism, which movement will be imparted to the frames by the engagement of the transverse plates 29 at the outer end of the frames with the dogs 15. This movement of the frames will be discontinued by disengaging the clutch 50 manually or by any well known automatic arrangement.

After the movement of the frames has been discontinued they may be locked in place by any suitable mechanism such as pawls 42A pivoted on the beams 21 which may be moved into engagement with one of the racks 42. Clutch 50 is then shifted to cause the chains to be driven and their movement will be imparted to the container until it is fully transferred to the car. This alternative operation is preferable for shifting heavy loads. It too may be reversed and the container transfer may be made to or from either side of the vehicle. By providing independent clutches for the rack and pinion mechanism and for the chain drive, the latter may be put into operation either before or after the movement of the frames has stopped.

Various modifications of structure may be made within the spirit or scope of this invention and I intend no limitations other than those imposed by the appended claims.

Having thus described my invention, what I claim is:

1. A frame slidably mounted on a vehicle, sprockets mounted on pivots near the ends of the frame, an endless chain running over said sprockets, a power driven sprocket mounted on a fixed pivot on the vehicle and engaging the chain to move the frame, a bar arranged to be connected at one end to a container on the vehicle, a dog on the other end of the bar arranged to engage the chain, a transverse member affixed to the frame in alinement with the dog to impart the movement of the frame in one direction to the container and a stop on the vehicle in the path of movement of said transverse member to limit the movement of the frame means for locking the frame against movement in the opposite direction, said power driven sprocket being arranged to impart a movement to the chain after the frame has reached the limit of its movement to impart further movement to the container in the same direction.

2. A frame slidably mounted on a vehicle, power mechanism for moving the frame across the vehicle, a bar arranged to be connected at one end to a container on the vehicle, a dog on the other end of the bar arranged to engage the chain, an abutment on the frame for engaging said dog, a stop on the vehicle in the path of movement of the abutment to limit the movement of the frame means for locking the frame against movement in the opposite direction, sprockets mounted on pivots near the ends of the frame, an endless chain running over said sprockets and independent means for driving the chain comprising a power driven sprocket on a fixed pivot on the vehicle.

3. A frame slidably mounted on a vehicle, means for limiting the movement of the frame, power driven rack and pinion mechanism for moving the frame across the vehicle means for locking the frame, sprockets mounted on pivots near the ends of the frame, an endless chain running over said sprockets, a bar arranged to interconnect the chain and the container, a member on the frame arranged to engage the bar to impart the movement of the frame to the container and independent means for driving the chain comprising a power driven sprocket on a fixed pivot on the vehicle.

4. A frame slidably mounted on a vehicle, means for limiting the movement of the frame, power driven rack and pinion mechanism for moving the frame across the vehicle means for locking the frame, sprockets mounted on pivots near the ends of the frame, an endless chain running over said sprockets, a bar arranged to interconnect the chain and the container, a member on the frame arranged to engage the bar to impart the movement of the frame to the container, independent means for driving the chain comprising a power driven sprocket on a fixed pivot on the vehicle, a reversible motor on the vehicle, and a clutch mechanism arranged to connect the motor with the rack and pinion mechanism and with the power driven sprocket.

5. A frame slidably mounted on a vehicle, power driven rack and pinion mechanism for moving the frame across the vehicle, a bar arranged to be connected at one end to a container on the vehicle, a dog on the other end of the bar arranged to engage the chain, an abutment on the frame for engaging said dog, a stop on the vehicle in the path of movement of the abutment to limit the movement of the frame means for locking the frame against movement in the opposite direction, sprockets mounted on pivots near the ends of the frame, an endless chain running over said sprockets, independent means for driving the chain comprising a power driven sprocket on a fixed pivot on the vehicle, a reversible motor on the vehicle, and a clutch mechanism arranged to connect the motor selectively with either the rack and pinion mechanism or with the power driven sprocket.

6. A pair of spaced frames mounted to slide transversely on a vehicle each having a rack affixed thereto, interconnected pinions engaging said racks for moving the frames, bars arranged to be connected at one of their ends to the container, dogs at the other ends of the bars arranged to engage the chains, abutments on the frames for engaging said dogs, stops on the vehicle in the paths of movement of the abutments to limit the movement of the frames means for locking the frames against movement in the opposite direction, sprockets mounted on pivots near the ends of the frames, endless chains running over said sprockets, driving sprockets mounted on a fixed pivot on the vehicle engaging the chain, a reversible motor on the vehicle, and a clutch mechanism arranged to connect the motor selectively with either the pinions or with the driving sprockets.

HAROLD W. SHONNARD.